April 6, 1937.   S. ASBURY   2,076,059
AIRCRAFT WING STRUCTURE
Filed Oct. 10, 1936   2 Sheets-Sheet 1
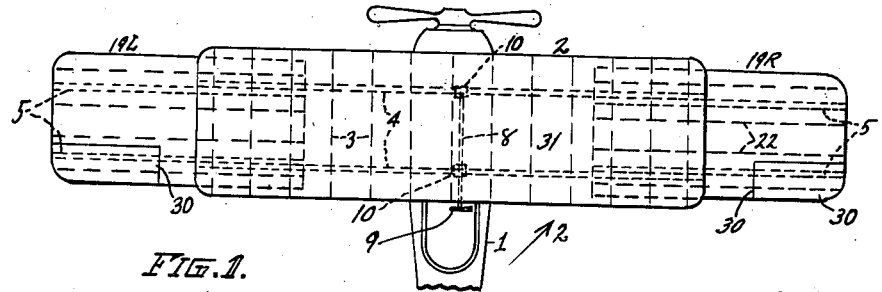
FIG. 1.
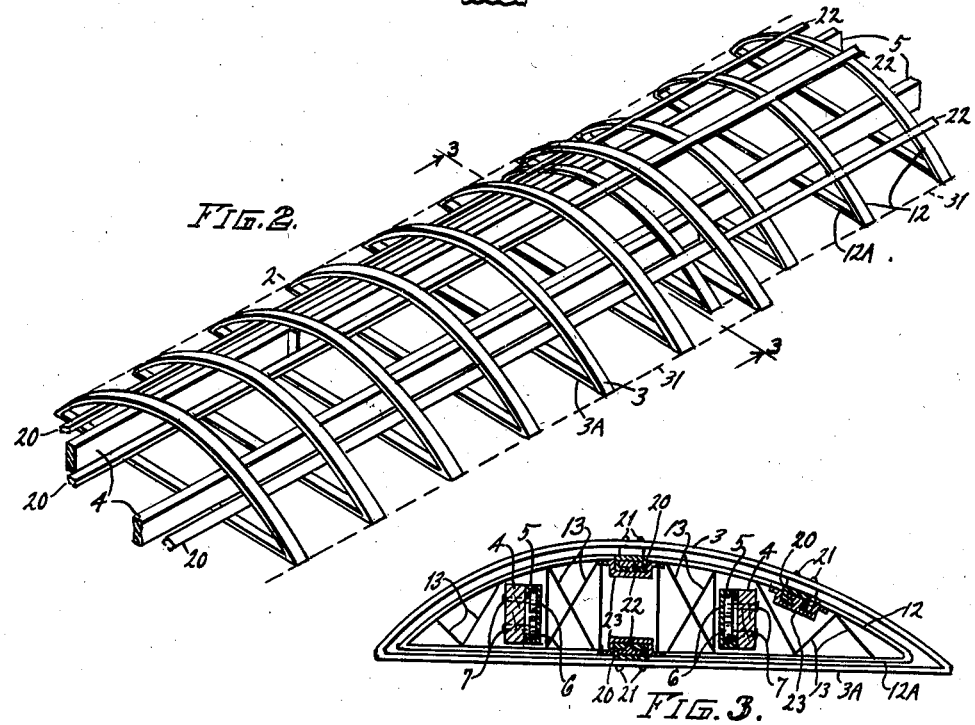
FIG. 2.
FIG. 3.
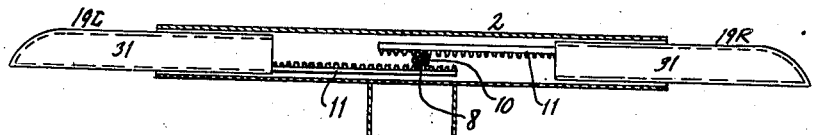
FIG. 4.
INVENTOR:
Stanley Asbury
BY David E. Carlsen
ATTORNEY.

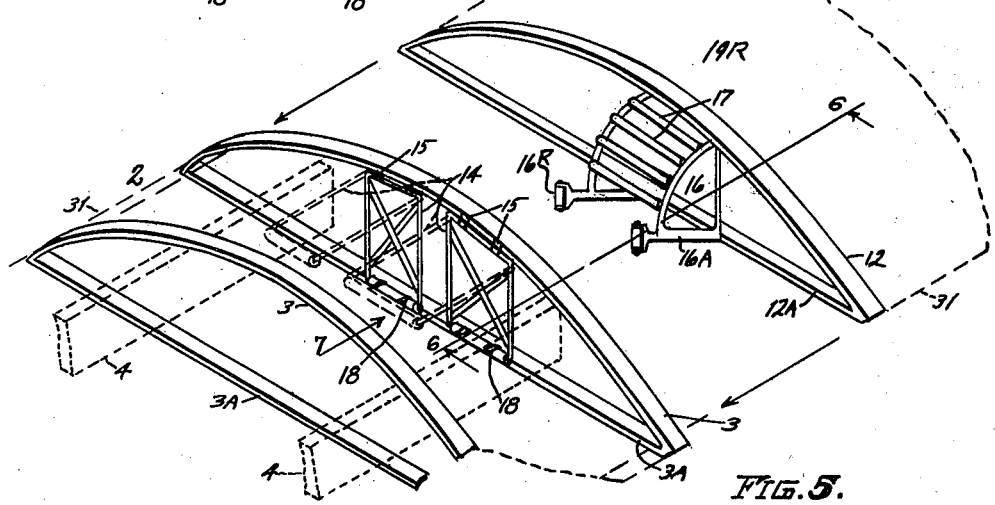

Patented Apr. 6, 1937

2,076,059

UNITED STATES PATENT OFFICE 2,076,059

AIRCRAFT WING STRUCTURE

Stanley Asbury, St. Paul, Minn.

Application October 10, 1936, Serial No. 105,010

5 Claims. (Cl. 244—43)

My invention relates to airplane construction, particularly to wing construction such that variable wing surface is provided as needed for take-offs, landings, cruising and other flying conditions.

An object of my invention is to provide telescopic wing construction or auxiliary wings of certain unique design such that when the auxiliary wings are extended as for landing or take-offs of an airplane the main or rigid wing in which the auxiliary wings are reciprocable is at all times in rigid and strong condition. To my knowledge certain telescopic wing construction has been made in various ways, but in each instance when the auxiliary wings or sections are in use the main wing is weakened structurally, the space within the main wing vacated by the projected auxiliary wing being left insufficiently braced. This latter condition is not stated to detract from any of the novel construction in such other devices but to clarify my main objective.

Further objects and advantages of my device are hereinafter fully set forth reference being had to the accompanying drawings in which,—

Fig. 1 is a top view of an airplane showing the auxiliary wings of my device extended. Fig. 2 is an enlarged perspective skeletonized view of approximately the right half of the main wing and the inner half of the right hand telescopic wing, about as seen in the direction indicated by arrow 2 in Fig. 1. Fig. 3 is a cross sectional view as on line 3—3 in Fig. 2. Fig. 4 is a central longitudinal section through the wings, as of Fig. 1, showing mainly certain means for expanding and contracting the telescopic wings simultaneously. Fig. 5 is a perspective, skeletonized view, on same perspective as Fig. 2 but showing the outer right hand end part of main wing and inner end part of telescopic wing separated therefrom. Fig. 6 is a detail, longitudinal view, in enlarged scale as on line 6—6 of Fig. 5 showing more in detail the means of placing and displacing the transverse main wing braces. Fig. 7 is a left end elevation of Fig. 6. Fig. 8 is a perspective view of a yieldable roller device used to brace the outer ends of the main wing with relation to the wing spars and Fig. 9 is a direct face view of Fig. 8 slightly modified. Fig. 10 is a detail view of the telescopic spring actuated part of the device shown in Figs. 8 and 9.

Referring to the drawings by reference numerals, similar parts designated by like numerals throughout the various views, I have shown a mono-plane of which 1 is the fuselage and 2 the main wing suitably attached thereto. The main wing is open at its ends and is of the usual arched construction transversely, comprising a series of regularly spaced ribs 3—3A of which 3 is the upper arched member and 3A the lower member which may be straight as best shown in Figs. 3, 5 and 7. 4 are the longitudinal spars of the main wing, shown two in number. 5 are a pair of corresponding spars in each wing extension each spar 5 projecting from the extension wing into the main wing and positioned parallel to one of the main spars 4 and slidably engaged therewith as follows: Each spar 5 comprises a metal channel flanged inwardly and at the side adjacent the corresponding main spar. Said channel spar serves as a rail, contacted interiorly of its channel (top and bottom) by a series of rollers 6 mounted on shafts 7 in spar 4 at suitably spaced locations. Thus the two telescopic wings (each built on and around the spars 5) are telescoped simultaneously into the main wing or movable out of it as desired for variable flying conditions.

The means for moving the extension wings simultaneously may be considerably varied but a desirable device therefor is shown in Figs. 1 and 4, namely a horizontal shaft 8 accessible for rotation at 9 in the cockpit (see Fig. 1). Said shaft carries a pair of sprockets 10 each engaging two rack bars 11 of which one extends inwardly from each extension wing and both bars overlap, the teeth thereof engaging the sprockets at opposite sides.

In Fig. 1 the extension wings are shown partially extended beyond the ends of the stationary wing, a condition desirable in airplanes for take-offs and landing purposes.

Each extension wing of my device is built on and around its spars 5 and comprises a number of equally spaced transverse ribs 12—12A corresponding in shape to the ribs 3—3A of the main wing, said ribs each having permanent bracing 13, as in Fig. 3. The main wing ribs of my improved construction are also braced by frame-brace sections designated 14 in Figs. 5, 6 and 7, said bracing frames being automatically positioned in each rib as the inner rib of the auxiliary wing moves outwardly from the interior of the stationary wing. This construction is a distinctive feature of my device and as far as I am aware is new and novel in the art.

It will be understood at this point that the frame braces 14 of the stationary wing are hinged at their top edges, as at 15 Figs. 6, 7 and 5, said frames being locked in their vertical positions to brace the ribs but being capable of displacement and arranged to be swung upward simultaneously to horizontal plane when the extension wing moves inwardly (see horizontal dotted line position of 14 in Fig. 6) and lie between the adjacent overlapping parts of the stationary and extension wings. To accomplish this action I provide the innermost rib 12—12A of the extension wing with a series of cam frames 16 one for each stationary wing brace 14.

Each said cam frame comprises a pair of upright parallel skeleton frames including a lower pair of inwardly projecting bars 16A and a pair of arcuate bars 16B extending upwardly integrally therefrom, a series of parallel rollers 17 being mounted in and between said latter bars 16B. The bars 16A project a predetermined distance and carry each at its extremity a vertical roller 16R. Assuming now that the outer wing is to be moved inwardly it will be readily seen that the rollers 16R first engage the side bars of frame 14 and dislodge the lower end of the frame swinging it free from its lower contact as with a curved leaf spring catch 18 (see Figs. 6 and 7). As the extension wing moves in the frame 14 rides and swings upwardly on the rollers 17 (see left part of Fig. 6) until the frame is in horizontal plane (see position 14X). The frames 14 of each rib section are thus removed from the path of the inwardly moving extension wing. During opposite or outward movement of the extension wing the opposite action occurs, the frames 14 dropping downward, riding on the rollers 17, the free end of each frame getting automatically positioned between the outermost roller 17 and the rollers 16R, between bars 16A, and as the outward movement continues the latter rollers 16R engage the side bars of frame 14 and pull the frame into locked, vertical position (shown in full lines in central part of Fig. 6 and in Fig. 7). As movement continues further and the frames 14 are positioned the moving rollers 16R are sprung outward to pass the frame 14.

It will now be readily seen that my extension wings (designated 19R and 19L as whole units) each comprise a light but solidly built structure both movable simultaneously into and out of the ends of the main wing, outward movement of said extension wings automatically and successively leaving each rib of the stationary wing properly braced.

Inward movement of the extension wing displaces the bracing means 14 but the displaced braces are compensated for by the presence of the rigidly built extension wing moving into the main wing and guidingly retained therein by further means which will now be described.

20 designates a number of box-channels suitably fixed parallel to each other and longitudinally of the main wing, the number of these channels being determined by size of wing. These box channels are fixed as at 21 to the inner sides of the ribs 3—3A and the inner face of each channel is slotted longitudinally (as 20S) as best shown in Fig. 7. In each extension wing is fixed longitudinally a number of T-rails 22 each positioned to be guidingly retained in one of said box-channels 20 (see Figs. 2 and 3). Thus rigidity of structure is maintained throughout the entire length of the wings. The T-rails are fixed to the ribs of the extension wing as in brackets 23.

It will be readily understood that wing covering fabric is put on the stationary wing in the usual manner. On the extension wings such fabric is also used but slitted longitudinally only enough to expose the T-rails 22.

To maintain the spars 4 of the main wing in proper spaced positions relative to the ribs 3—3A particularly at such times as the wings are extended, I provide a number of pairs of spar contacting rollers 24 as in Figs. 8 and 9, Fig. 8 showing the two rollers of a pair, one above and one underneath the spar. Each roller is normally held in spar contacting position by a pair of links 25 pivotally retained at 26 at the inner side of the rib 3 or 3A as the case may be.

27—27A is a tubular telescopic member connected to the outer part of each link (opposite from the rib) 25 and extending angularly as to a pivot 28 at the inner side of the rib, said telescopic tube being enclosed by a coil spring 29 which normally holds the roller in contact with the adjacent face of the spar. Member 27—27A limits outward movement of the roller to vertical and it will be readily seen that when a series of these rollers are alined at the forward side of the advance rib 12 this construction helps to prevent lateral strains caused by wind pressure and said rollers also properly aline the inner or advance end of the extension wing when telescopic action starts.

In Fig. 9 an extension wing rib 12 is shown about to move the roller inwardly, toward the left, as the end of the extension wing starts moving into the main wing, the telescopic construction described allowing the roller to yield as the end rib rides between it and the spar 4. Between the other ribs of the extension wing the rollers 24 ride on the face of the fabric 31 passing thereunder.

The use of my improved airplane construction has been fully disclosed simultaneously with the above description of its construction.

The drawings have been made to reveal preferred construction as applied to a monoplane but it is obvious that the same principles of construction are applicable to other types of heavier-than-air flying craft. No attempt has been made to illustrate an air-craft of approved design or proportions and some figures may have details of construction in different proportions and numbers in the various views; for example, in Fig. 3 only three box rails and corresponding T-rails are shown, whereas in Fig. 2 there are three box rails shown connected to the upper rail 3 of the main wing.

In actual use there may be any number of T-rails and box-channels, necessarily in vertically spaced pairs so as to permit unobstructed swinging of the rib-frame braces 14 of the main wing.

30 designates an aileron at the outer end part of each extension wing the telescopic movement of said wings inwardly being limited by the size of these ailerons which of course can not be telescoped into the main wing. Suitable telescopic and rotary shaft means (not shown) as needed, must be installed longitudinally of the wings and connected to said ailerons for tilting control of the latter as required during flying.

Other modifications may be embodied without departing from the scope and spirit of my invention. Among such modifications is included any suitable means for providing simultaneous telescopic movement other than the means shown in Fig. 4. Obviously the manipulating means for extension wing movement and aileron manipulation must be located in a position within the cock-pit available to the pilot.

I claim:

1. An airplane comprising a fuselage and a transverse wing rigidly fixed thereto and projecting equi-distant from both sides of the fuselage, a pair of elongated wing extension members telescopically mounted within the fixed wing one to each side of the fuselage, means operable from within the fuselage to move said wing extensions simultaneously into or out of the ends of the fixed wing, said fixed wing of longitudinal tubular construction and including a series of spaced rib frames conforming in contour to the cross section of the wing, fixed lateral bracing in said wing and transverse upright bracing means mounted within and between the upper and lower rib frame parts, means on the inner end of each extension wing for displacing said main wing braces during inward movement of the extension wing, said means contracting and seating said brace means of the main wing in bracing position successively in each stationary wing rib when the extension wing is moved outwardly.

2. The structure specified in claim 1, in which each said extension wing comprises also an elongated tubular structure and stationary transverse and lateral bracing in said wing.

3. An airplane wing construction a main wing stationary with relation to the fuselage and projecting laterally equi-distant from both sides of the fuselage; said wing of elongated tubular form embodying a series of spaced rib frames each comprising an upper arched bar and a lower comparatively straight bar, permanent brace means connecting said ribs and bracing the stationary wing longitudinally, bracing means in each rib frame comprising a series of frames pivotally suspended from the arched bar and each such frame removably securable in rib frame bracing position, an extension wing member oscillatable within the stationary wing at each side of the fuselage and means for oscillating both extensions simultaneously to project the extension wings out of the opposite ends of the stationary wing or retract them thereinto, said bracing frames of the stationary wing ribs hingedly mounted and arranged to be contacted and displaced by the inward movement of the extension wings and to lie between the adjacent upper walls of the overlapped parts of movable and stationary wing, said frames subsequently arranged to initially drop toward their bracing positions as the extension wings move outwardly, and means on the inner end of each extension wing to engage said dropping brace frames and move them into seated bracing position, each set of bracing frames simultaneously in their rib frame and in the successive rib frames passed by inner end of the extension wing during outward movement.

4. The structure specified in claim 3, in which said rib-bracing-frame engaging means comprises for each such frame at the inner end of the extension wing, an inwardly directed skeleton frame with a downwardly arcuate upper face to initially support a released main wing rib-frame and ease it downward gently as the extension wing moves outwardly, a pair of arms extending inwardly from said arcuate frame, an upright roller in the end of each said arm for contact of the opposite side parts of the depending frame to respectively engage and disengage the latter in and out of its seated bracing position according to outward or inward movement of the extension wing.

5. The structure specified in claim 3, and a number of parallel fixed beams fixed longitudinally of and within the main wing and traversing the rib-frames thereof between said pivotally suspended bracing frames, a corresponding rail beam for each said fixed beam and fixed longitudinally within the extension wing, roller means mounted in each stationary beam, the extension wing beams comprising each a channel rail engaged and guided by said rollers of its adjacent and parallel stationary beam.

STANLEY ASBURY.